Figure 1:
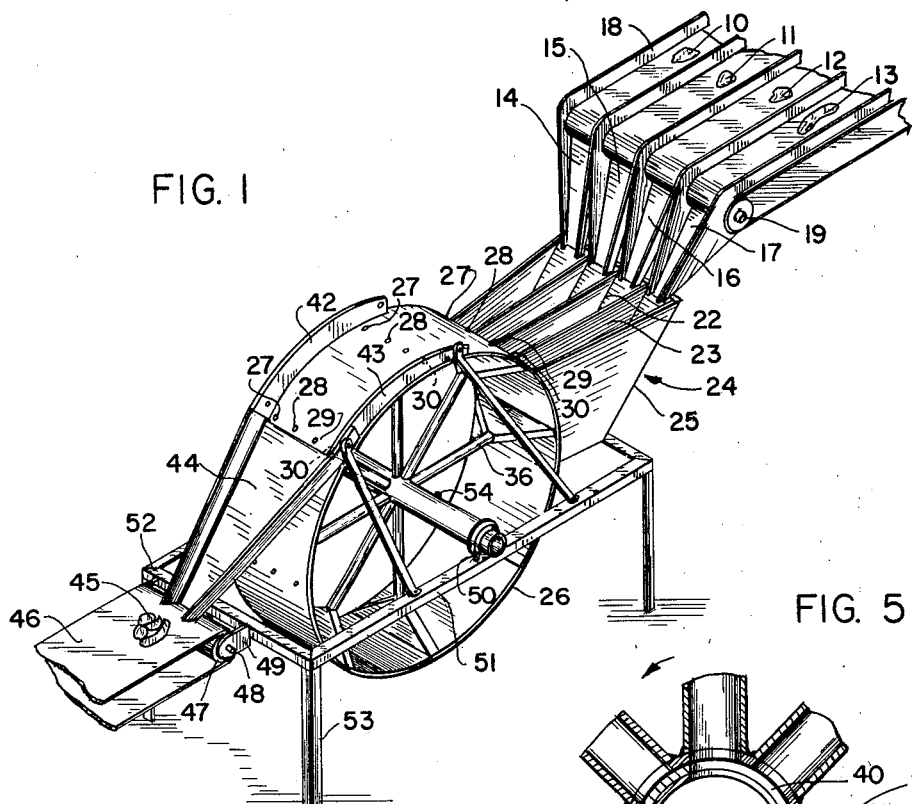

April 7, 1964 E. C. LEMMOND 3,127,975
APPARATUS FOR SELECTING AND COMBINING SMALL PARTS OF POULTRY
Filed Oct. 17, 1962

INVENTOR
EVERETT C. LEMMOND

BY
ATTORNEYS

United States Patent Office 3,127,975
Patented Apr. 7, 1964

3,127,975
APPARATUS FOR SELECTING AND COMBINING SMALL PARTS OF POULTRY
Everett C. Lemmond, Rte. 3, Somerville, Ala.
Filed Oct. 17, 1962, Ser. No. 231,242
3 Claims. (Cl. 198—32)

This invention relates to the preparation of foods of various kinds, as well as to other things, where it is desired to combine objects for a particular project ordinarily involving a number of workmen in the accomplishment of the desired end.

The invention relates particularly to the bringing together of multiple objects, or segments, for use in a particular way, as for example, in the combining of the smaller parts of poultry or the like, in which the neck, liver, gizzard and heart are placed in a package with the remainder of the chicken to be sold in chain food stores or otherwise used and in a manner that the purchaser or one acquiring the poultry or the like will obtain in addition to the carcass a small package with the other parts.

In the dressing and packaging of poultry for sale and use where refrigeration is employed, the smaller parts, such as the gizzard, heart, liver and neck, are refrigerated prior to one of each being put into a package, all of which has involved substantial labor costs for workmen to transfer each of the articles from a separate collection to a common location so that they can be wrapped into one bundle, and such cost has proved a great deterrent in operations of this kind from a practical viewpoint in which the expense of operation did not exceed the market value nor the profit.

It is an object of the invention to provide simple inexpensive labor-saving transfer apparatus or mechanism for moving small particles, such as the several small parts of poultry, from specific separate locations to a common location in order that they may be readily packaged and all at considerable saving and labor costs.

Another object of the invention is to provide a hopper or feed bin with multiple chambers into which individual articles or bodies are adapted to be deposited in separate locations with suction means for removing such articles or bodies one at a time simultaneously from multiple compartments and regardless of the shape of the article, with such means including the application of suction from the time of the pick-up to the time of discharge only, from which they can travel by gravity to a common location for collection and wrapping and further disposition.

A further object of the invention is to provide a practical, reliable, efficient and durable apparatus including a hopper or feed bin with multiple individual compartments and means for supplying multiple articles in said compartments from separate sources and with removable means for simultaneously picking up one article from each of said compartments including a wheel incorporating suction means at spaced intervals along its circumference and tubular axle and spokes through which suction is exerted for performing the transferring operation.

Figure 5:
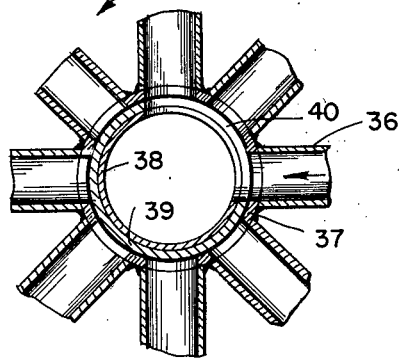
Figure 2:
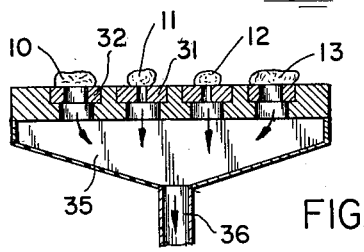
Figure 3:
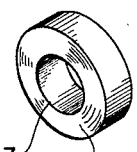
Figure 4:
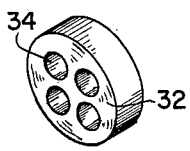

Other objects and advantages of the invention will be apparent from the following description taken in conjunction with the accompanying drawings wherein:

FIG. 1 is a perspective illustrating one application of the invention;

FIG. 2, a sectional view of the suction wheel;

FIGS. 3 and 4, enlarged details of the nozzle of FIG. 2;

FIG. 5, an enlarged fragmentary view of the hub of the device of FIG. 1; and

Figure 6:
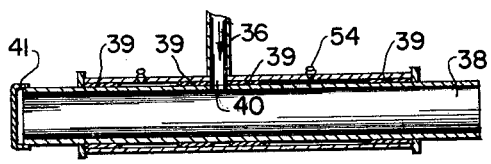

FIG. 6, an enlarged fragmentary view of the axle or shaft on which the hub is rotatably mounted.

Briefly stated the invention is a labor-saving device including a hopper or feed bin with multiple chambers into which individual objects, such as specified small parts of poultry to be combined in a separate package are supplied and kept in individual collections or piles with means for removing one of each simultaneously and depositing them in a common location, such means including a wheel having a rim with openings across and in spaced locations around the same and with a valve having an opening extending from a horizontal position adjacent to the articles to be picked up to a vertical position so that the articles across the rim at one spoke and at successive spokes will be retained until the articles at the top of the wheel are no longer subjected to suction but will fall by gravity along a chute to a common discharge location for the collection, wrapping and further disposition.

With continued reference to the drawing articles 10, 11, 12 and 13, which may be the heart, gizzard, liver and neck of poultry, and one of each of which articles is desired to be combined in a package, are supplied from independent sources in a poultry dressing plant through chutes 14, 15, 16 and 17. If desired a conveyor 18 may supply each of said chutes, such conveyor extending around one or more pulleys 19 and driven in any desired manner.

The chutes 14 to 17 discharge into chambers 22 and 23 of a hopper or bin 24 having an inclined wall 25 to cause objects on said wall to gravitate to the left for contact with a rim 26, having a spaced series of transverse openings 27, 28, 29 and 30 through which suction is exerted as these openings pass upwardly within the respective chambers 20, 21, 22 and 23 simultaneously to pick up a single article from each chamber and with the rim 26 carry it to be simultaneously discharged, as will be later described.

The rim 26 is of a width to accommodate multiple items across the same and within each of the openings 27, 28, 29 and 30 are removable nozzles 31 and 32, as shown in FIGS. 2, 3 and 4, the nozzle 31 having a small suction opening 33 and the nozzle 32 having multiple small suction openings 34.

In order to provide suction through the several nozzles a housing 35 is of a size to encompass all of the nozzle openings and such housing is connected with a suction pipe 36 which forms a spoke of the wheel and leads to a hub 37 mounted on an axle or shaft 38.

Between the axle and the hub is a valve-forming bushing in the form of a sleeve 39 having its upper right portion removed providing an opening 40 to cause suction to be applied therethrough, by means of the spokes 36 and housing 35 from the axle 38 the outer end of which is provided with a cap or closure 41.

Thus suction through each of the openings 27, 28, 29 and 30 will pick up an article from each of the bins 20, 21, 22 and 23, provided such bins have parts therein, and due to the fact that the quarter section 40 is removed these parts will be carried upward to a top position between side members or guides 42 and 43 between which they will be carried forward and move by gravity simultaneously into a discharge chute 44 to a common location 45 which may be directly onto a conveyor belt 46 mounted on a pulley 47 on a roller 48 carried by space brackets 49.

The axle 38 is mounted by means of a U-clamp 50 by which is attached to a pair of space bars 51 forming the size of a rectangular frame having ends 52 and mounted on legs 53. The axle may be supplied with grease through fittings 54.

It will be apparent from the foregoing that the present invention is a simple, practical, low-cost construction by means of which an independent collection of articles may be supplied to the multiple compartments of a feed bin or hopper from which they can be readily and easily removed one from each simultaneously and deposited collectively for wrapping and further disposition; that the device is fool-proof and will operate reliably and satisfactorily for indefinite periods.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. Apparatus for transferring individual small chicken parts, one at a time simultaneously, from separate masses of said parts and depositing the individual parts as a group in a common location for further disposition, said apparatus comprising a feed bin having individual compartments each for holding multiple individual items of like character with the bottom of said bin inclined to cause movement in a given direction toward an open discharge side, a wheel having a rim in proximity with said open side and with openings through said rim in communication through said open discharge side with the interior of said compartments, a housing on the inner side of said rim over said openings, a tubular shaft, a hub on said shaft, tubular spokes connecting said hub and said housing and in communication with said bin a valve-forming member between said axle and hub and having an opening extending from its horizontal to its verticle portions whereby suction may be exerted therethrough to pick up articles in said feed bin and carry them upwardly to a vertical position from which they will travel downwardly by gravity to a common area, said wheel having a series of such spokes for continuously picking up and discharging articles, and guard members on each side of the rim of the wheel along the area of gravitational travel.

2. Apparatus for use in a poultry processing plant where poultry parts are detached during processing and later are added to provide a complete fowl for the consumer, said apparatus comprising a hopper having multiple compartments each for a group of parts of the same general character, selecting and combining mechanism in communication with the several compartments of the hopper and including suction means for causing simultaneous pickup of an article from each compartment and for transporting simultaneously the individual parts to the combining mechanism, for bringing together one each of the parts to be combined, said combining mechanism having means to receive and channel together the several articles one from each group, and means for collecting simultanously the combined independent parts in units with one each of the parts in each unit.

3. Apparatus for combining individual articles from separate sources, said apparatus comprising hopper means with compartments for containing separate masses of individual articles to be combined, selecting and combining mechanism having communication with said compartments of said hopper means, said selection mechanism including suction pickup means constructed to pick up an article from each mass, said combining mechanism having means to receive and channel together the several articles one from each mass, and means for collecting the collected units with each unit containing one each of the individual articles.

References Cited in the file of this patent

UNITED STATES PATENTS

| | | |
|---|---|---|
| 1,040,025 | Schlesinger | Oct. 1, 1912 |
| 2,152,758 | Cox | Apr. 4, 1939 |
| 2,806,580 | Tarot | Sept. 17, 1957 |
| 2,860,762 | Alexander | Nov. 18, 1958 |
| 3,058,568 | Rudszinat | Oct. 16, 1962 |
| 3,083,809 | Fischer | Apr. 2, 1963 |
| 3,084,783 | Morton | Apr. 9, 1963 |